No. 857,112. PATENTED JUNE 18, 1907.
W. S. ROATH.
TROLLEY CATCHER.
APPLICATION FILED APR. 26, 1905.

2 SHEETS—SHEET 1.

WITNESSES
Jos. J. Hosler.
Minnie L. Anthony.

INVENTOR
William S. Roath,
BY
Harry Frease
ATTORNEY

No. 857,112. PATENTED JUNE 18, 1907.
W. S. ROATH.
TROLLEY CATCHER.
APPLICATION FILED APR. 26, 1905.

2 SHEETS—SHEET 2.

WITNESSES
Jos. J. Hosler.
Minnie L. Anthony.

INVENTOR
William S. Roath,
BY
Harry Frease
ATTORNEY

UNITED STATES PATENT OFFICE.

WILLIAM S. ROATH, OF CANTON, OHIO.

TROLLEY-CATCHER.

No. 857,112.  Specification of Letters Patent.  Patented June 18, 1907.

Application filed April 26, 1905. Serial No. 257,426.

*To all whom it may concern:*

Be it known that I, WILLIAM S. ROATH, a citizen of the United States, residing at Canton, in the county of Stark and State of Ohio, have invented a certain new and useful Improvement in Trolley-Catchers, of which the following is a specification.

The invention relates to a spring resisted reel for holding a trolley rope taut and for catching and holding it when the trolley jumps off the wire; and the objects of the improvement are to balance the locking dogs by a connecting spring, and to wind the main spring to a desired tension by rotating the cover of the case. These objects are attained by the construction, mechanism and arrangement illustrated in the accompanying drawings, in which—

Figure 3:
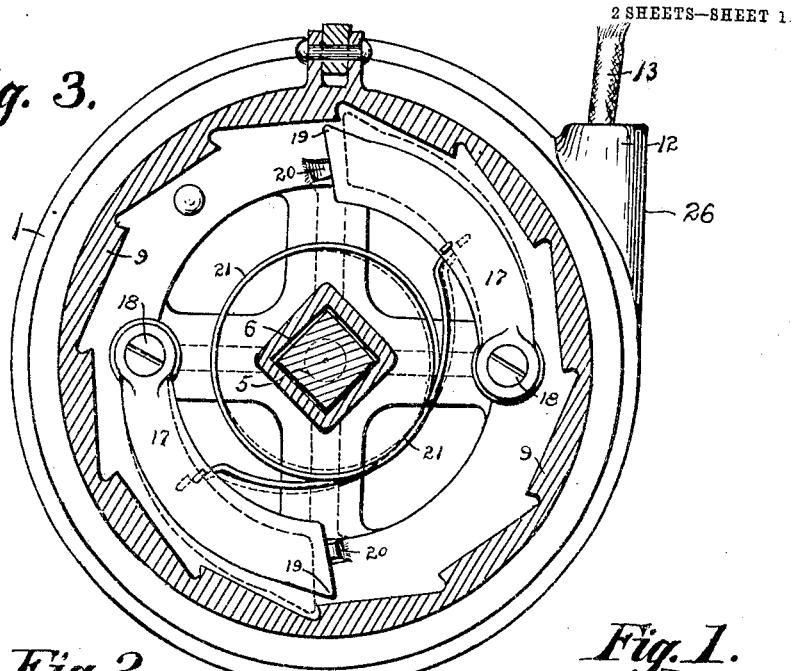
Figures 1, 2:
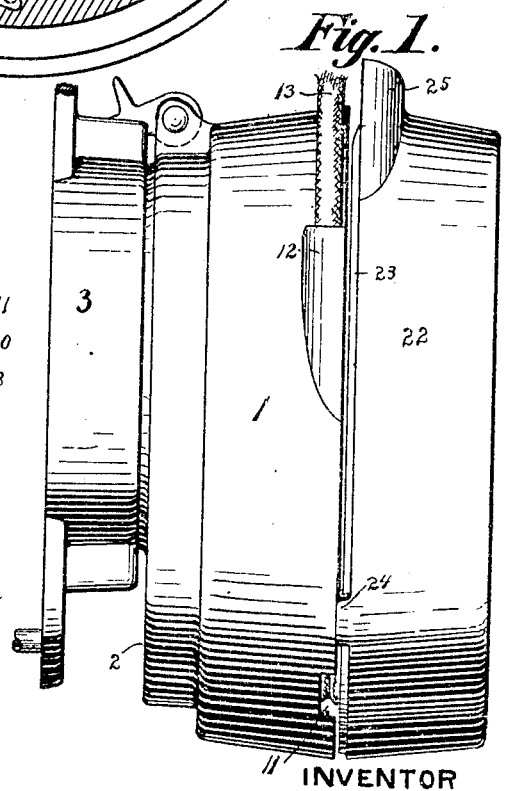
Figure 5:
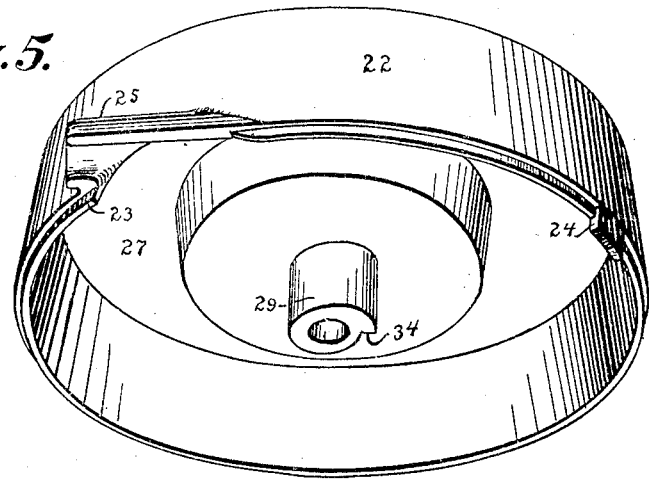
Figure 4:
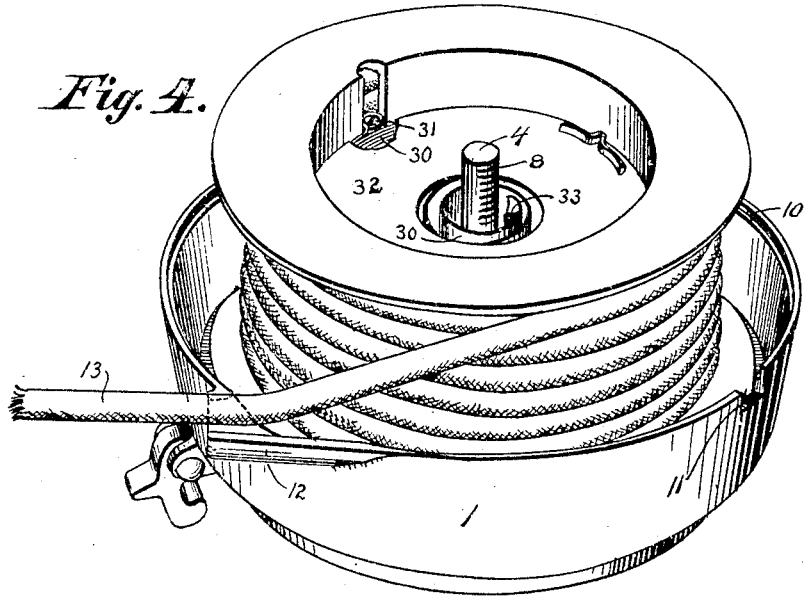

Figure 1 is a side elevation of the catcher showing the cover slightly separated for winding the spring; Fig. 2, a vertical-longitudinal section of the catcher with the parts in operative relation; Fig. 3, a vertical-cross section on line 3—3, Fig. 2; Fig. 4, a perspective view of the case and reel with the cover removed; and Fig. 5, a perspective view of the cover.

Similar numerals refer to similar parts throughout the drawings.

The body 1 of the case is substantially cylindric in form, with one end closed by the wall 2, and this part of the case is preferably releasably attached to the plate 3, which plate is in turn securely attached to the end of a car, not shown, at any convenient place, these attachments being made in any ordinary and well known manner, and form no part of the present invention. In the axial line of the case is provided the pivot-post 4, which as illustrated is preferably composed of a bolt having its angular head 5 countersunk in the similar recess 6 formed in the end-wall 2 of the case, and having the ordinary nut 7 on the threaded end 8. The annular ratchet 9 is formed in the cylindric-wall of the case next to the end-wall thereof, and the free rim is provided with the rabbet 10, the notch 11, and the semi-tubular tangent-extension 12 for passing the trolley rope 13.

The reel 14 is journaled on the pivot-post by means of the hub 15 located adjoining or adjacent to the end-wall 2, preferably with the intervening bearing washer 16. The dogs 17 are pivoted opposite each other by the screws 18, or their equivalent, on the side of the reel adjacent to the end-wall of the case and in the plane of the annular ratchet, in which the toes 19 of the dogs are adapted to engage when they are thrown outward. The dogs are normally held inward against the stops 20 by the annular spring 21 which is coiled one or more times freely around the pivot-post and has its ends secured to the dogs equidistant from their pivots. By means of this coiled spring connection the dogs are each held against centrifugal movement by the same degree of elastic resistance, and are delicately balanced in their operation.

When the trolley jumps off the wire, the rope is given a jerk which suddenly and quickly rotates the reel in the direction of the toes of the dogs, and the dog which first engages a tooth of the adjacent annular ratchet serves to stop the reel against further rotation and to hold the trolley against further movement upward. It will be understood that when the ratchet teeth are so spaced as to bring two teeth diametrically opposite, the dogs will engage two teeth at the same time, as shown by broken lines in Fig. 3; but when the teeth are so staggered that no two of them are diametrically opposite, the dog which first engages a tooth will act to stop the reel. Each dog is thus available to stop the reel, for being equally balanced they will both be thrown out at the same time, and the first one which engages a tooth will stop the reel. The stops 20 serve to normally hold the dogs inward with their toes adjacent to the teeth of the ratchet so that only a slight outward throw of the dogs is necessary to bring their toes into engagement with the teeth.

The cover 22 of the case is similar in general shape to the body thereof, and has the flange 23 on the rim, which fits into the rabbet 10 in the rim of the body, the lug 24 which fits in the notch 11 in the rim of the body and the semi-tubular tangent-extension 25 which registers with the similar projection 12 on the body when the lug is entered in the notch, and thus completes the tubular tangent-guide 26 for the trolley rope 13. The end wall 27 of the cover is preferably indented in the middle part thus forming the recess 28, and projecting inward from this wall is provided the axial sleeve 29 which is adapted to neatly slip over the free end of the pivot-post. When the parts are thus assembled, the inner end of the sleeve forms a bearing for the hub of the reel, and in this relation the parts are held in place by the nut 7 on the free end of the pivot-post, which nut being located in the recess 28 is well within the outline of the case cover, and the recess enables the nut to be readily reached by a wrench for manipulation.

The main spring 30 is coiled within the reel. The outer end of the spring is attached at or near the periphery of the reel, as by the screw 31, and the spring is preferably held in place by the ring-disk 32. On the inner side of the inner end of the spring is provided the square shoulder 33 which is adapted to abut against the opposing square shoulder 34 on the sleeve of the cover. The main spring is formed and the inner end is normally located, as shown in Fig. 4, so that the cover-sleeve can be entered into engaging relation with it. When the cover-sleeve is thus engaged with the inner end of the main spring, and before the cover-lug is engaged in the case-notch, the spring can be wound to any desired degree of tension by merely rotating the cover, as illustrated in Fig. 1. After the spring is sufficiently wound, the cover is turned so that the lug and notch and the two parts of the tubular tangent-guide register, in which position the cover is closed on the case where it is held by the nut 7, as shown in Fig. 2. To increase or decrease the tension of the main spring, it is only necessary to partly remove the nut 7, whereupon the cover can be disengaged from the case and rotated in the desired direction, after which the parts are re-engaged and held in proper position by the nut.

What I claim as my invention, and desire to secure by Letters Patent, is—

1. In a trolley catcher, a case having an annular ratchet therein, a rotatable reel in the case having centrifugally acting dogs oppositely pivoted thereon with toes adapted to engage the ratchet, and a coiled spring connecting the dogs to normally hold them in from such engagement.

2. In a trolley catcher, a case having a rotatable reel therein, a coiled spring in the reel having its outer end attached thereto, a rotatable cover on the case having an axial projection adapted to telescope in the spring with means for releasably connecting the projection with the inner end of the spring, and means for stopping the cover against rotation when it is closed on the case.

3. In a trolley catcher, a case having a rotatable reel therein, a coiled spring in the reel having its outer end attached thereto and having a shoulder on the inside of its inner end, a rotatable cover on the case having an axial projection adapted to telescope in the spring there being a shoulder on the projection adapted to engage the spring-shoulder, and means for stopping the cover against rotation when it is closed on the cover.

4. In a trolley catcher, a case having an axial post therein, a reel journaled on the post, a coiled spring in the reel having its outer end attached thereto, a rotatable cover on the case having a sleeve adapted to telescope on the post and in the spring with means for releasably connecting the sleeve to the inner end of the spirng, and means for stopping the cover against rotation when it is closed on the case.

5. In a trolley catcher, a case having an axial post therein, a reel journaled on the post, a coiled spring in the reel having its outer end attached thereto and having a shoulder on the inside of its inner end, a rotatable cover on the case having a sleeve adapted to telescope on the post and in the spring there being a shoulder on the sleeve adapted to engage the spring-shoulder, and means for stopping the cover against rotation when it is closed on the case.

In testimony whereof I have hereunto signed my name to this specification in the presence of two subscribing witnesses.

WILLIAM S. ROATH.

Witnesses:
MINNIE F. ANTHONY,
HARRY FREASE.